United States Patent [19]
Dudley et al.

[11] Patent Number: 5,729,396
[45] Date of Patent: Mar. 17, 1998

[54] FAULT TOLERANT SYNC MARK DETECTOR ENABLED RELATIVE TO A FREQUENCY OF AN ACQUISITION PREAMBLE FOR SAMPLED AMPLITUDE RECORDING

[75] Inventors: Trent O. Dudley, Littleton; Richard T. Behrens, Louisville; Christopher P. Zook, Longmont, all of Colo.

[73] Assignee: Cirrus Logic, Inc., Fremont, Calif.

[21] Appl. No.: 440,268

[22] Filed: May 12, 1995

[51] Int. Cl.$^6$ .......................................... G11B 5/09
[52] U.S. Cl. ..................... 360/51; 375/355; 375/365
[58] Field of Search ............................ 360/46, 49, 51, 360/40, 45, 53; 370/105.4; 375/341, 340, 345, 376, 355, 365, 371, 368; 371/43; 367/100; 528/203; 235/98; 369/47, 48, 59

[56] References Cited

U.S. PATENT DOCUMENTS

| | | | |
|---|---|---|---|
| 4,442,513 | 4/1984 | Mead | 367/100 |
| 4,506,305 | 3/1985 | Cardero | 360/46 |
| 4,748,519 | 5/1988 | Lagadec et al. | 235/48 |
| 5,202,408 | 4/1993 | Scholz | 528/203 |
| 5,231,545 | 7/1993 | Gold | 360/49 |
| 5,260,976 | 11/1993 | Dolivo et al. | 375/341 |
| 5,321,559 | 6/1994 | Nguyen et al. | 360/46 |
| 5,420,893 | 5/1995 | Ward | 375/368 |
| 5,424,881 | 6/1995 | Behrens et al. | 360/40 |
| 5,448,571 | 9/1995 | Hong et al. | 370/105.4 |
| 5,493,454 | 2/1996 | Ziperovich et al. | 360/45 |

OTHER PUBLICATIONS

Edward A. Lee, David G. Messerchmitt, "Timing Recovery", *Digital Communications*, Kluwer Academic Publishers, Boston, 1988, Chapter 15, pp. 560–585.

*Primary Examiner*—Aristotelis M. Psitos
*Assistant Examiner*—Patrick Wamsley
*Attorney, Agent, or Firm*—Howard Sheerin

[57] ABSTRACT

A sampled amplitude read channel reads data from a magnetic medium by detecting digital data from a sequence of discrete time sample values generated by sampling an analog read signal from a read head positioned over the magnetic medium. The digital data comprises a preamble field followed by a sync mark followed by a data field. Timing recovery in the read channel synchronizes to a phase and frequency of the preamble field and a sync detector detects the sync mark in order to frame operation of an RLL decoder for decoding the detected data field. To decrease the probability of early misdetection, the sync mark is chosen to have minimum correlation with shifted versions of the sync mark concatenated with the preamble field. To further increase the fault tolerance, the sync mark detector is enabled by timing recovery relative to the end of the preamble field. A state machine in timing recovery generates expected sample values used to acquire the preamble field, and a current state of the state machine indicates when the preamble ends relative to a predetermined clock interval. In this manner, the search for an appropriate sync mark need only look for minimum correlation during shifts at the predetermined clock interval, thereby increasing the fault tolerant characteristic of the sync mark.

25 Claims, 7 Drawing Sheets

FAULT TOLERANT SYNC MARK DETECTOR ENABLED RELATIVE TO A FREQUENCY OF AN ACQUISITION PREAMBLE FOR SAMPLED AMPLITUDE RECORDING

FIELD OF INVENTION

The present invention relates to the control of magnetic storage systems for digital computers, and particularly, to a sampled amplitude read channel incorporating a fault tolerant sync mark detector.

CROSS REFERENCE TO RELATED APPLICATIONS AND PATENTS

This application is related to other co-pending U.S. patent applications, namely application Ser. Nos. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," 08/313,491 entitled "Improved Timing Recovery For Synchronous Partial Response Recording," and 08/012,266 entitled "Synchronous Read Channel." This application is also related to several U.S. patents, namely U.S. Pat. Nos. 5,359,631 entitled "Timing Recovery Circuit for Synchronous Waveform Sampling," 5,291,499 entitled "Method and Apparatus for Reduced-Complexity Viterbi-Type Sequence Detectors," 5,297,184 entitled "Gain Control Circuit for Synchronous Waveform Sampling," and 5,329,554 entitled "Digital Pulse Detector." All of the above-named patent applications and patents are assigned to the same entity, and all are incorporated herein by reference.

BACKGROUND OF THE INVENTION

In magnetic disk storage systems for computers, digital data serves to modulate the current in a read/write head coil so that a sequence of corresponding magnetic flux transitions are written onto a magnetic medium in concentric tracks. To read this recorded data, the read/write head passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by using a discrete time sequence detector in a sampled amplitude read channel. Discrete time sequence detectors are preferred over simple analog pulse detectors because they compensate for intersymbol interference (ISI) and, therefore, are less susceptible to noise. As a result, discrete time sequence detectors increase the capacity and reliability of the storage system.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry, responsive to threshold crossing or derivative information, detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference, a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits. A typical RLL code is a (1,7) ⅔ rate code which encodes 8 bit data words into 12 bit codewords to satisfy the (1,7) constraint.

Sampled amplitude detection, such as partial response (PR) with Viterbi detection, allows for increased data density by compensating for intersymbol interference. Unlike conventional peak detection systems, sampled amplitude recording detects digital data by interpreting, at discrete time instances, the actual value of the pulse data. The analog pulses are sampled at the baud rate (code bit rate) and the digital data is detected from these discrete time sample values. A discrete time sequence detector, such as a Viterbi detector, interprets the discrete time sample values in context to determine a most likely sequence for the data. In this manner, the effect of ISI can be taken into account during the detection process, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, Sept. 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, Nov. 1991; and Carley et al, "Adaptive Continous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, Sept. 1994; and Abbott et al, "Timing Recovery For Adaptive Decision Feedback Equalization of The Magnetic Storage Channel", *Globecom'90 IEEE Global Telecommunications Conference* 1990, San Diego, Calif., Nov. 1990, pp.1794–1799; and Abbott et al, "Performance of Digital Magnetic Recording with Equalization and Offtrack Interference", *IEEE Transactions on Magnetics*, Vol. 27, No. 1, Jan. 1991; and Cioffi et al, "Adaptive Equalization in Magnetic-Disk Storage Channels", *IEEE Communication Magazine*, Feb. 1990; and Roger Wood, "Enhanced Decision Feedback Equalization", *Intermag'90*.

The format of the data stored on the magnetic disk, as shown in FIG. 2A and 2B, is similar for both peak detection and sampled amplitude read channels. The data is stored as a series of concentric tracks 13 each comprising a number of user data sectors 15 and embedded servo data sectors 17. As illustrated in FIG. 2A, the embedded servo data sectors 17 are recorded at the same data rate across the disk's radius. For the user data sectors 15, however, the disk is partitioned into a number of zones (e.g., an outer zone 11 and an inner zone 27) and the data rate increased in the outer zones in order to achieve a more constant linear bit density. This allows more data to be stored in the Outer diameter tracks, thereby increasing the overall capacity of the disk.

FIG. 2B shows the format of a user data sector 15 and a servo data sector 17 comprising a preamble (68,5), sync mark (70,7) and data field (72,3). The read channel processes the preamble (68,5) to adjust the magnitude of the read signal (and synchronize timing recovery in sampled amplitude read channels) so that it can accurately read the data field (72,3). The sync mark (70,7) marks the beginning of the data field (72,3). When the read channel detects the sync mark (70,7) it signals a disk controller (not shown) to begin processing the detected data.

The sync mark (70,7) must be detected at the correct time or the read channel cannot synchronize to the data field (72,3). Errors due to noise in the system can cause the read channel to detect the sync mark (70,7) too early or fail to detect it altogether. That is, errors in the detected read signal can cause the read channel to falsely detect the sync mark as the end of the preamble Concatenated with the beginning of the sync mark. When this happens, error detection circuitry within the disk controller will recognize that the sync mark was falsely detected and initiate a re-try. The storage system will wait for the disk to complete a revolution, which increases the overall access time, and again attempt to accurately detect the sync mark.

A sync detector in the read channel detects the sync mark (70,7) by correlating a target sync mark with the bit sequence detected from the read signal. In order to minimize the probability of early misdetection, the sync mark (70,7) is selected to have a minimum correlation with the sync mark (70,7) concatenated with the preamble (68,5). It is also selected for maximum probability of correct detection when the sync mark is corrupted by errors due to noise. This is accomplished with a computer search program which searches for an appropriate sync mark by correlating a target sync mark with shifted values of the target sync mark appended to the preamble. The search program also correlates the target sync mark with corrupted versions of the sync mark appended to the preamble. Selecting a sync mark to have minimum correlation with the preamble increases the fault tolerance of the sync mark detector.

Prior art sync mark detectors do not use the preamble (68,5) to assist in detecting the sync mark (70,7). Instead, conventional sync mark detectors execute a correlation with each new bit detected from the read signal. For example, U.S. Pat. No. 5,384,671 issued to Fisher discloses a sync mark detection technique that selects a sync mark to have minimum correlation with the preamble but does not use information from the preamble in the detection process.

What is needed is a sync mark detection technique that uses information from the preamble (70,7) in order to further increase the fault tolerance of the sync mark detector.

SUMMARY OF THE INVENTION

In a storage device for storing digital data on a magnetic disk in a series of concentric tracks comprising a number of user data sectors and embedded servo data sectors where each sector comprises a preamble, sync mark and data field, a sampled amplitude read channel employs a fault tolerant sync mark detector that uses information from the preamble to improve the sync mark detection process. A state machine generates expected sample values used by a timing recovery circuit to acquire the preamble field. The preamble is recorded to the disk in a manner that ensures the state machine will be in a predetermined state when the end of the preamble is encountered. In this manner, the sync mark detector need only execute a correlation of the detected bit sequence with a target sync mark when the state machine is in the predetermined state.

As the bit sequence is detected from the read signal with each new sample period, it is shifted into a shift register. The sync mark detector correlates the detected bit sequence with a target sync mark and outputs a sync mark detected signal when the sync mark found. The output of the sync mark detector is enabled according the current state of the state machine, i.e., at a predetermined sample period interval. In one example embodiment, the end of preamble can occur only when the state machine is in two of four states. Therefore, the sync detector is enabled at every other sample period. In another embodiment, the sync mark detector processes the even and odd interleaves of the detected bit sequence in parallel, and the current state of the state machine initializes the sync mark detector rather than enable its output.

In both of these embodiments, the sync mark detector's output represents the correlation of the bit sequence with the target sync mark only during a predetermined sample period interval. This increases the fault tolerance of the sync mark detector and the fault tolerant characteristics of the sync mark itself by allowing the computer search program to search for a sync mark having minimum correlation with the preamble at the predetermined interval.

DETAILED DESCRIPTION OF THE PREFERRED EMBODIMENT

Conventional Sampled Amplitude Read Channel

Figure 1:
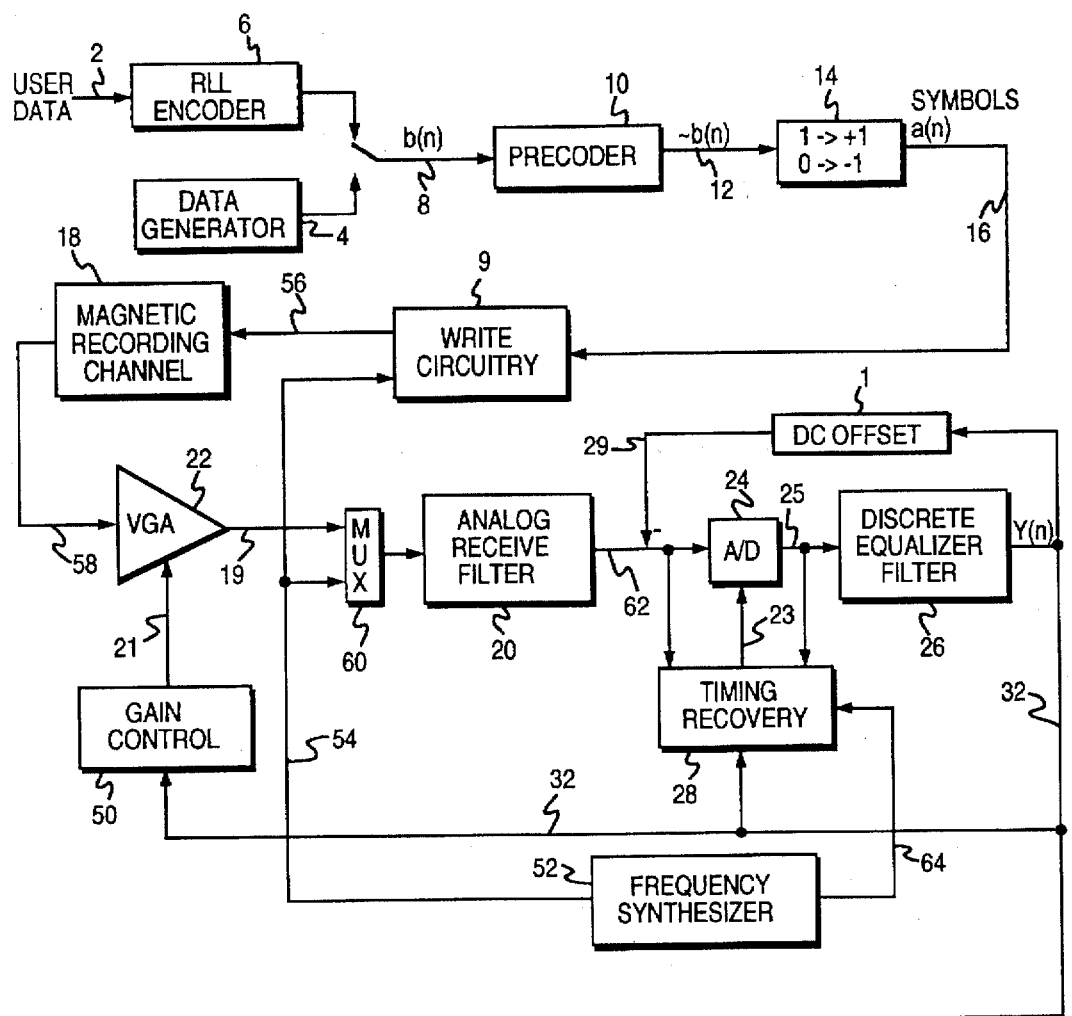
FIG. 1 is a block diagram of a conventional sampled amplitude recording channel.
Figure 1:
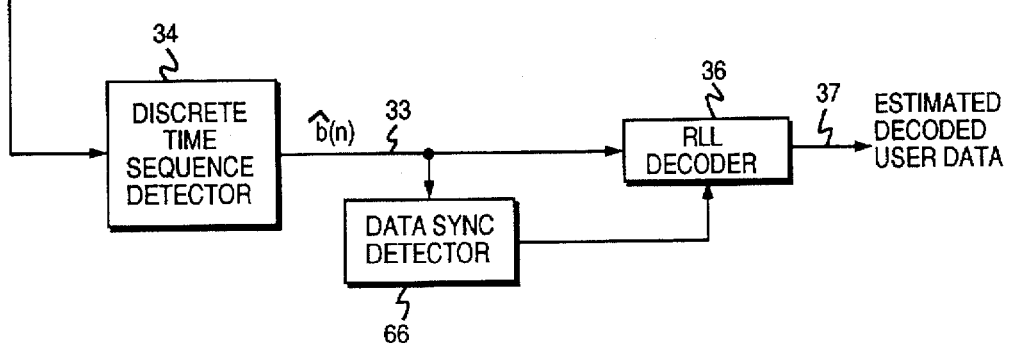

FIG. 1 is a detailed block diagram of a conventional sampled amplitude read channel. During a write operation, either user data 2 or preamble data from a data generator 4 (for example 2T preamble data) is written onto the media. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the medium. A frequency synthesizer 52 provides a baud rate write clock 54 to the write circuitry 9.

When reading the recorded binary sequence from the medium, timing recovery 28 is first locked to the write frequency by selecting, as the input to the read channel, the write clock 54 through a multiplexer 60. Once locked to the write frequency, the multiplexer 60 selects the signal 19 from the read head as the input to the read channel in order to acquire the acquisition preamble. A variable gain amplifier 22 adjusts the amplitude of the analog read signal 58, and an analog filter 20 provides initial equalization toward the desired response. A sampling device 24 samples the analog read signal 62 from the analog filter 20, and a discrete time filter 26 provides further equalization of the sample values 25 toward the desired response. In partial response recording, for example, the desired response is often selected from Table 1. A DC offset circuit 1 responsive to the equalized sample values 32 computes and subtracts the DC offset 29 from the analog read signal 62.

Figure 2A:
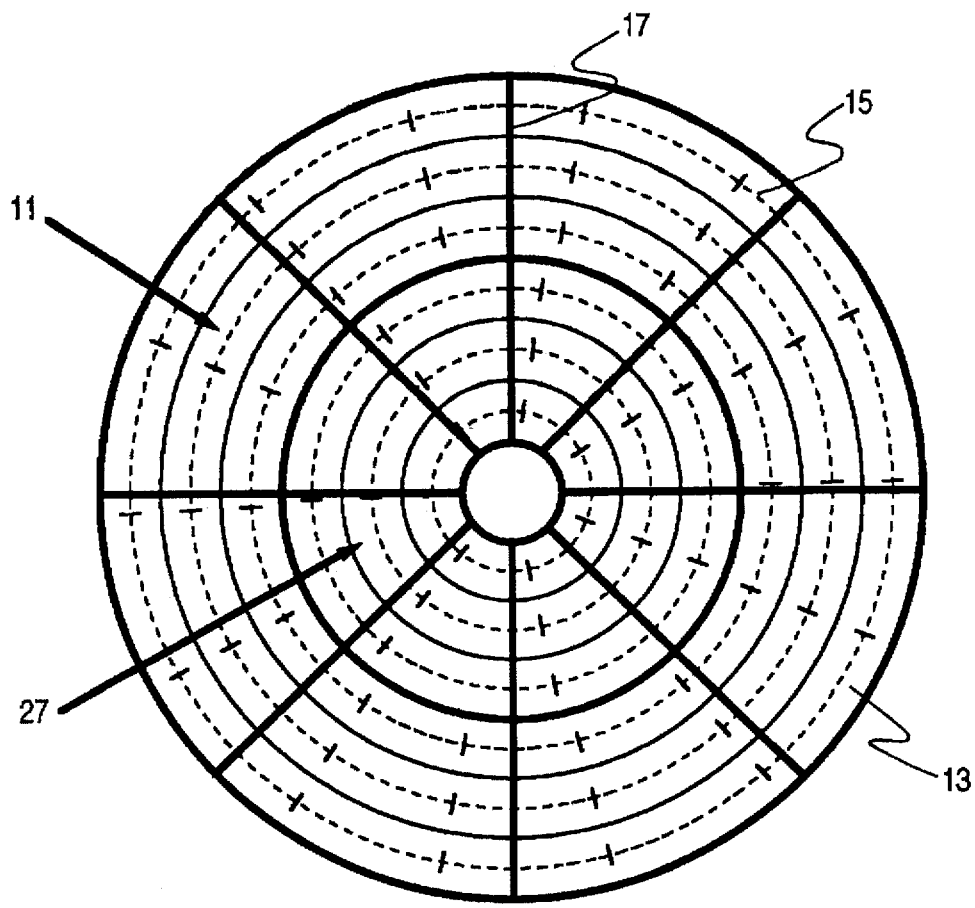
FIG. 2A shows an exemplary data format of a magnetic disk having a plurality of concentric tracks recorded in zones at varying data rates where each track contains a plurality of user data and embedded servo data sectors.
Figure 2B:
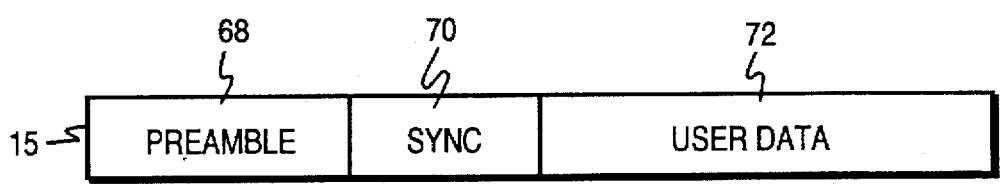
FIG. 2B shows an exemplary format of a user data sector and an embedded servo data sector.
Figure 2B:
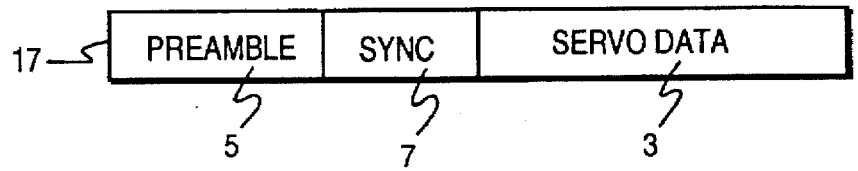

The equalized sample values 32 are applied to decision directed gain control 50 and timing recovery 28 for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a coarse center frequency setting to the timing recovery circuit 28 over line 64 in order to center the timing recovery frequency over temperature, voltage, and process variations. Gain control 50 adjusts the gain of variable gain amplifier 22 over line 21. The equalized samples Y(n) 32 are sent to a discrete time sequence detector 34, such as a maximum likelihood (FLL) Viterbi sequence detector, to detect an estimated binary sequence ^b(n) 33. An RLL decoder 36 decodes the estimated binary sequence ^b(n) 33 into estimated user data 37. A data sync mark detector 66 detects the sync mark 70 (shown in FIG. 2B) in the data sector 15 in order to frame the operation of the RLL decoder 36 and signal the beginning of user data 72. In the absence of errors, the estimated binary sequence ^b(n) 33 is equal to the recorded binary sequence b(n) 8, and the decoded user data 37 is equal to the recorded user data 2.

Improved Sampled Amplitude Read Channel

Figure 3:
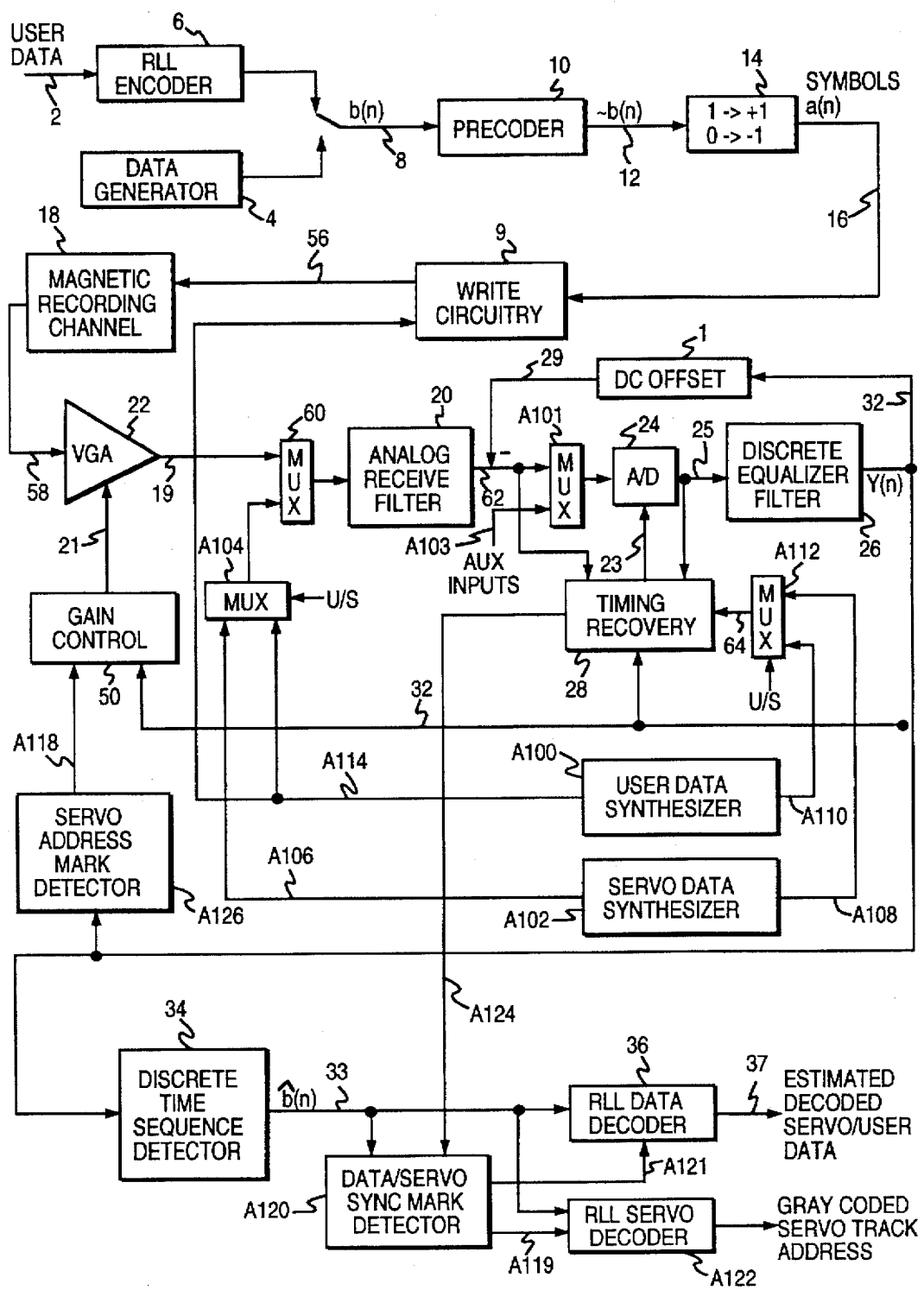
FIG. 3 is a block diagram of the sampled amplitude read channel of the present invention comprising automatic gain control, DC offset control, timing recovery, a first and second synthesizer for processing user and servo data respectively, an asynchronous servo address mark detector, and a sync mark detector for detecting user data and servo data sync marks.

FIG. 3 is a block diagram of the improved sampled amplitude read channel of the present invention comprised of a user data frequency synthesizer A100 and a servo data frequency synthesizer A102. When reading user data, a control line U/S selects the output A114 of the user data synthesizer A100 as the lock to reference frequency through a multiplexer A104. The control line U/S also selects the coarse center frequency setting A110 through a multiplexor A112 as the timing recovery control signal 64. When the read channel switches into servo data mode in order to read a servo wedge, the control line U/S selects the output A106 of the servo data synthesizer A102 as the lock to reference frequency through multiplexer A104. The control line U/S also selects the coarse center frequency setting A108 from the servo data synthesizer A102 through multiplexer A112 as the timing recovery control signal 64.

The read channel further comprises an asynchronous servo address mark detector A126 for generating a control signal A118 indicating when the servo address mark has been detected. The servo address mark detector A126 switches operation of the gain control circuit over line A118 to compensate for the unpredictable amplitude fluctuations caused by the inter-track head position and the wide range of user to servo data densities.

A data/servo sync detector A120, responsive to the detected binary sequence 33 from the sequence detector 34, detects both user data and servo data sync marks and generates framing signals (A121,A119) to frame operation of a user data RLL decoder 36 and a servo data RLL decoder A122, respectively. The sync detector A120 is also responsive to a control signal A124 from the timing recovery circuit 28 to aid in the sync detection process.

The read channel further comprises auxiliary analog inputs for sampling other analog signals generated within the disk drive such as the driving current for a Voice Coil Motor in a servo system, or the output of a temperature sensor. A multiplexer A101 selects, as the input to sampling device 24, the analog read signal 62 from the analog receive filter 20 or one of a plurality of auxiliary input signals A103. When an auxiliary input is selected for sampling, the output 25 of the sampling device 24 is stored into registers for subsequent processing by a microcontroller such as a servo controller.

Data/Servo Sync Detector

After acquiring the preamble (68,5) (shown in FIG. 2B), a data/servo sync mark detector A120 of FIG. 3 searches for the sync mark (70,7) which demarks the beginning of the user or servo data fields. When the sync mark (70,7) is detected, the data/servo sync detector A120 enables operation of the RLL data decoder 36 or the RLL servo decoder A122 in order to-frame the user or servo data fields.

The data/servo sync mark detector A120 detects the sync mark (70,7) by correlating a target sync mark with the estimated ,bit sequence b(n) 33 from the discrete time sequence detector. In order to minimize the probability of early misdetection, the sync mark (70,7) is selected to have a minimum correlation with the sync mark (70,7) concatenated with the preamble (68,5). It is also selected for maximum probability of correct detection when the sync mark is corrupted by errors due to noise. This is accomplished with a computer search program which searches for an appropriate sync mark by correlating a target sync mark with shifted values of the target sync mark appended to the preamble. The search program also correlates the target sync mark with corrupted versions of the sync mark appended to the preamble.

Figure 4:
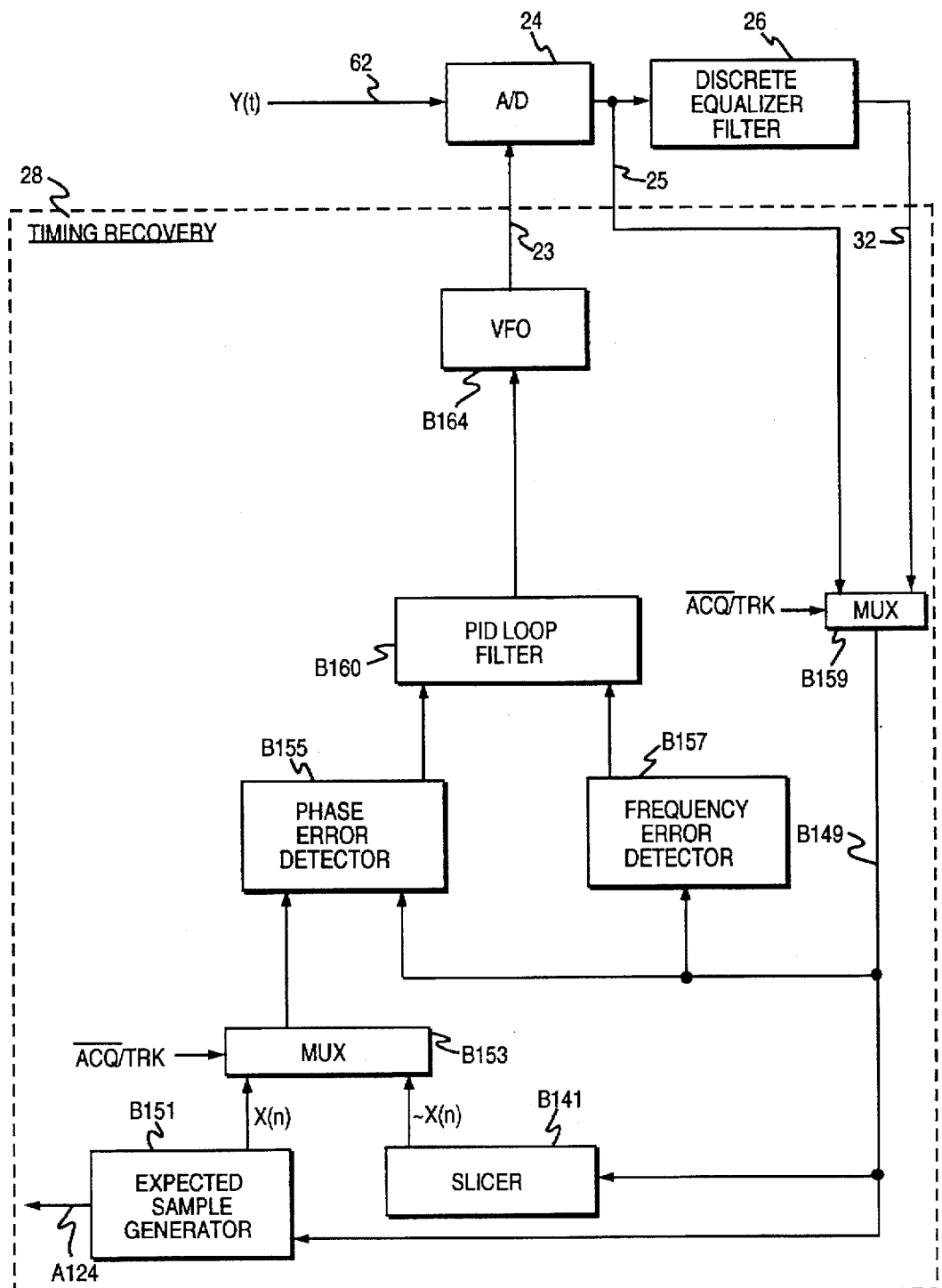
FIG. 4 is a block diagram of a sampled amplitude read channel timing recovery circuit comprising a VFO for generating a sampling frequency.
Figure 5:
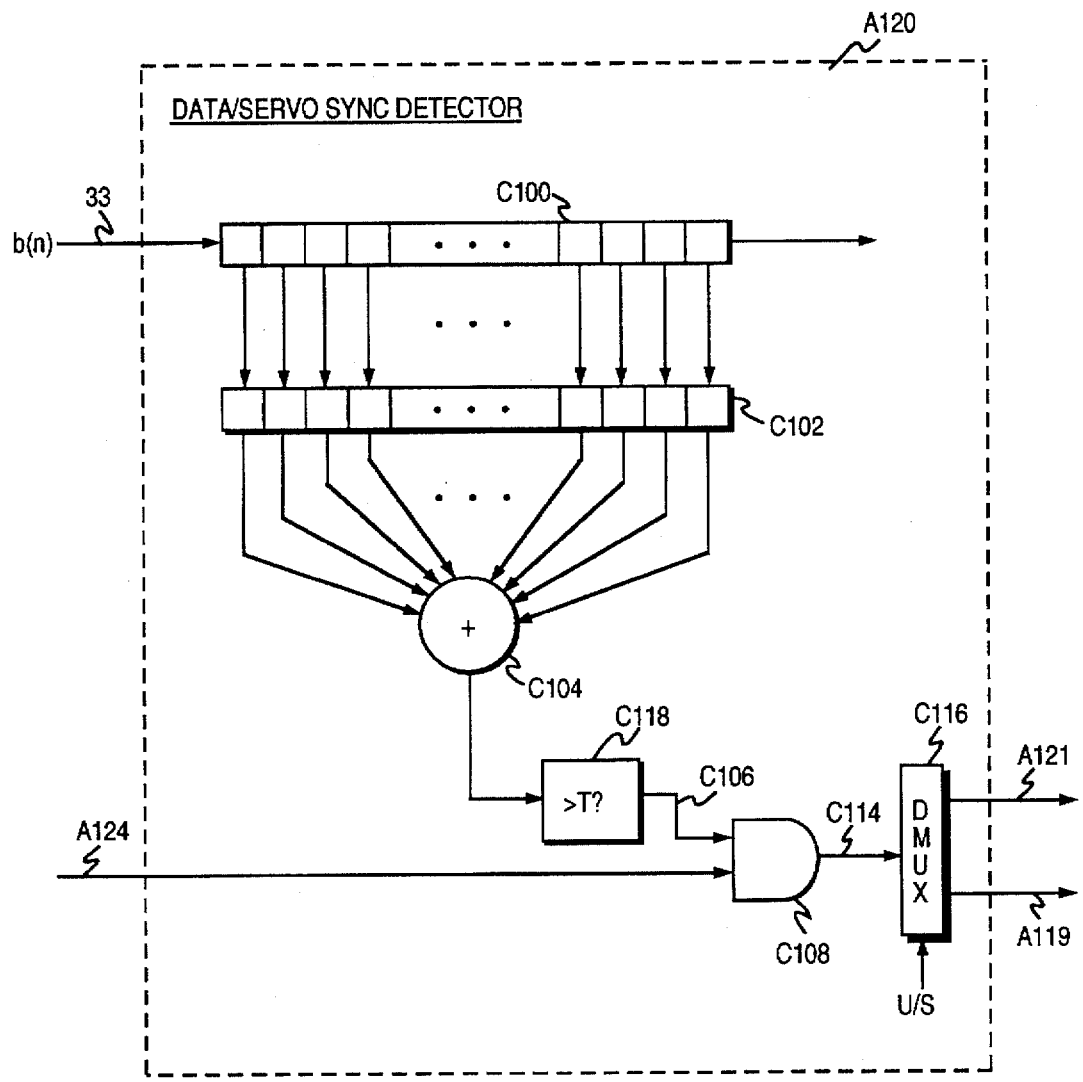
FIG. 5 shows more details of the data/servo sync detector and particularly the operation with respect to the timing recovery control signal.

Operation of the correlation process is understood with reference to FIG. 5. The estimated bit sequence b(n) 33 is shifted into a shift register C100 and the target sync mark (servo or data) is loaded into register C102. Registers C100 and C102 are programmable to accommodate various sync mark lengths. The corresponding bibs of registers C100 and C102 are correlated (using an exclusive-nor gate not shown) and summed with an adder C104. A threshold comparator C118 compares the output of the adder C104 to a predetermined programmable threshold and outputs a threshold correlation signal C106. The threshold correlation signal C106 is enabled through an AND gate C108 by a control signal A124. The output C114 of the AND gate C108 is applied to the RLL decoder framing signals (A121,A119) through de-multiplexer C116 according to the state of the U/S control signal. The control signal A124 for enabling the threshold correlation signal C106 is understood in relation to the operation of the timing recovery circuit 28, an overview of which is provided in FIG. 4.

In FIG. 4, the output 23 of a variable frequency oscillator (VFO) B164 controls the sampling clock of a sampling device 24 which is typically an analog-to-digital converter (A/D) in digital read channels. A frequency error detector B157 and phase error detector B155 control the frequency of the VFO B164, and a loop filter B160 provides control over the closed loop characteristics. A multiplexor B159 may select the unequalized sample values 25 during acquisition, and the equalized sample values 32 during tracking. From the sample values received over line B149, the frequency error detector B157 generates a frequency error, and the phase error detector B155 generates a phase error. The phase error is also computed from expected sample values X(n) from an expected sample generator B151 during acquisition, and estimated sample values ~X(n) from a sample value estimator B141, such as a slicer according to Table B2, during tracking.

Referring again to FIG. 2B, before acquiring the acquisition preamble (68,5) the phase-lock-loop first locks onto a predetermined nominal sampling frequency for the zone where the current track is located. In this manner, the phase-lock-loop is close to the desired acquisition frequency when it switches to acquisition mode. As previously mentioned, the acquisition preamble (68,5) is processed during acquisition mode in order to lock the PLL to the desired sampling phase and frequency before sampling the user or servo data fields (72,3). Once locked onto the acquisition preamble, the phase-lock-loop switches into tracking mode and, after detecting the sync mark (70,7), begins tracking user or servo data (72,3).

A data generator 4, connected to the input of the precoder 10, outputs a series of "1" bits to generate a 2T training preamble sequence at the output of the precoder 10 of the form (1,1,0,0,1,1,0,0,1,1,0,0 . . . ). This 2T preamble maximizes the magnitude of a PR4 read channel, and during acquisition, it is "side sampled" to generate the following sample sequence:

(+A,+A,−A,−A,+A,+A,−A,−A,+A,+A,−A,−A . . . ).

Figure 6A:
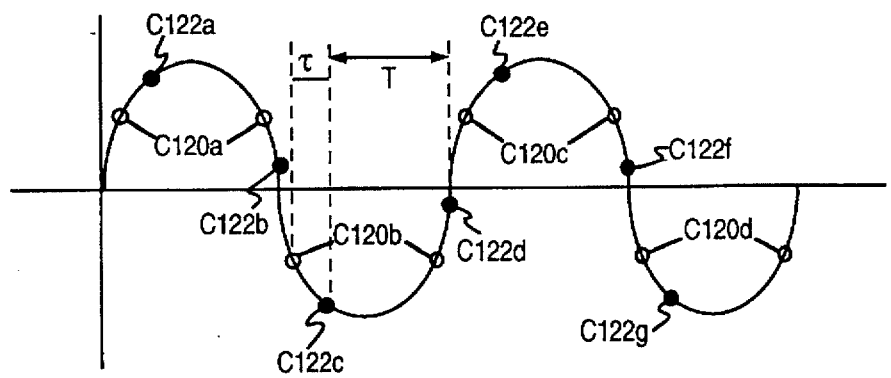
FIG. 6A shows the acquisition read signal with corresponding actual and estimated sample values.
Figure 6B:
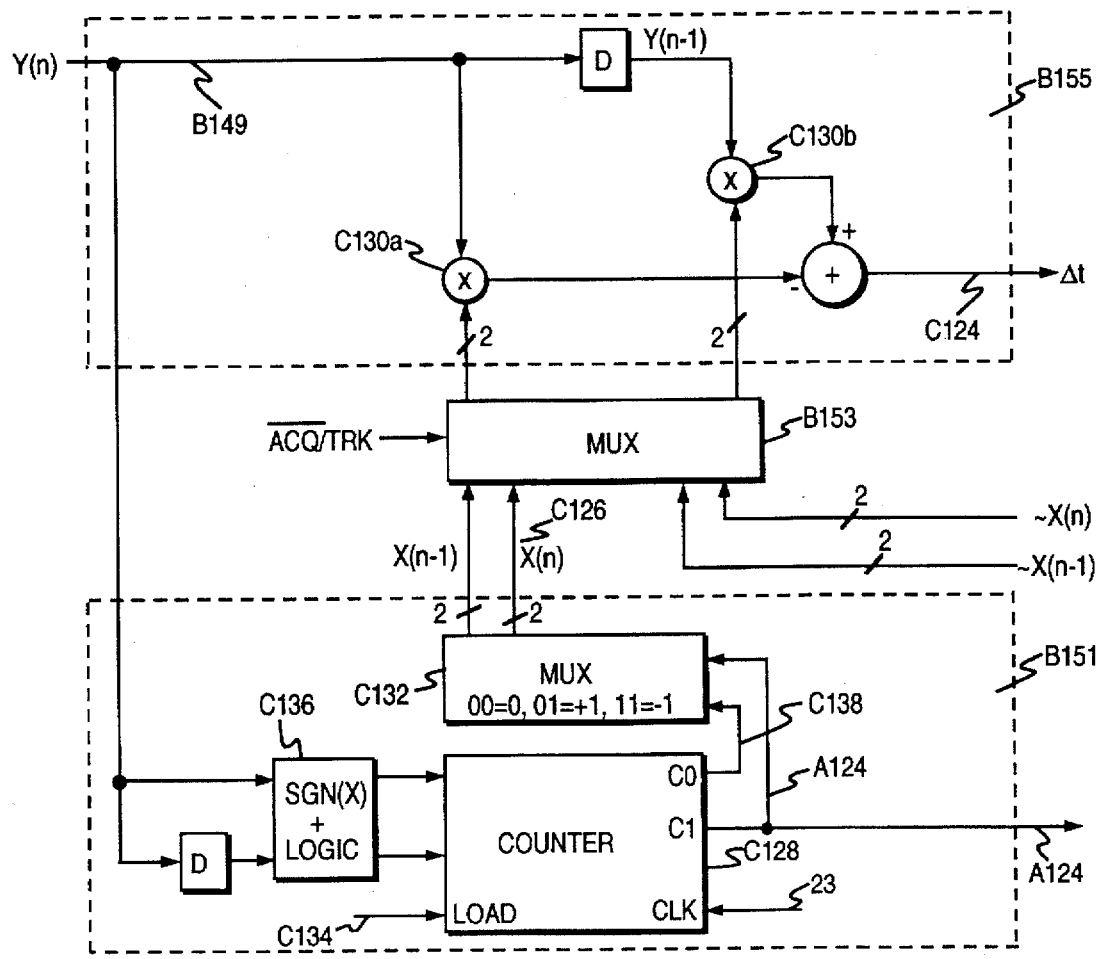
FIG. 6B is a detailed diagram of the preferred embodiment for the expected sample value generator and phase error detector used in the timing recovery circuit.

FIG. 6A shows the 2T preamble "side sampled" with the expected samples C120 in relation to the signal samples C122 and a corresponding phase error Y. FIG. 6B shows an implementation of the phase error detector B155 and the expected sample value generator B151 of FIG. 5. To adjust the initial sampling timing phase, the phase error detector B155 computes a timing gradient which minimizes the mean squared error between signal sample values and expected sample values. The timing gradient value Δt C124 is computed as:

$$\Delta t(n) = Y(n-1) \cdot X(n) - Y(n) \cdot X(n-1)$$

where Y(n) are the signal sample values B149 and X(n) are the expected sample values C126.

Referring again to FIG. 6B, the outputs (C138,A124) of a 2-bit counter C128 correspond to the expected "side sampled" preamble sequence:

00→+A,−A
01→−A,−A
10→−A,+A
11→+A,+A.

The expected sample value is scaled to |A|=1 so that the multipliers (C130a,C130b) of the phase error detector B155 multiply by +1, −1 or 0. Thus, the expected sample values X(n) C126 are two bits wide in order to represent the ternary values:

(00=0, 01=1, and 11=−1).

A multiplexer C132, responsive to the outputs (C138,A124) of the counter C128, selects the expected sample values X(n) C126 which correspond to the current state.

The counter C128 is loaded C134 with an initial starting state by logic C136 in response to two consecutive sample values Y(n) B149. The counter output bits C0 C138 and C1 A124 are initialized to:

$$C0 = sgn(Y(N-1));$$

and $$C1 = sgn(Y(n)) \text{ XOR } sgn(Y(n-1))$$

where sgn(x) returns a 0 if x is positive and 1 if negative. Table C2 shows the "side sampled" starting state values loaded into counter C128 corresponding to the two consecutive sample values.

After the counter C128 is loaded with the initial starting state, it sequences through the states according to the expected samples in the 2T preamble at each sample clock 23. The four possible sequences are:

(+A,−A,−A,+A,+A,−A, . . . );
(−A,−A,+A,+A,−A,−A, . . . );
(−A,+A,+A,−A,−A,+A, . . . ); and
(+A,+A,−A,−A,+A,+A, . . . ).

As a result, a "hang up" problem associated with the prior art is avoided, and, in addition, the state of counter C128 can be advantageously used in the selection and detection of the sync mark (70,7).

If the 2T acquisition preamble (68,5) always ends with two positive samples or two negative samples (e.g., samples C120d in FIG. 6A), then the sync mark (70,7) will be completely loaded into register C100 only when the counter C128 of FIG. 6B is in state (−A,−A) or state (+A,+A) which corresponds to counter C128 outputs 01 and 11. That is, register C100 of FIG. 5 will contain at least one bit of the acquisition preamble preceding the sync mark if the counter is in state (+A,−A) or (−A,+A) which corresponds to counter outputs 00 and 10. Therefore, the data/servo sync mark detector A120 should be enabled only when the counter C128 is in state (+A,+A) or state (−A,−A) (i.e., only at every other sample period). As shown in FIG. 5, the C1 counter output A124 is applied to the AND gate C108 to enable the threshold correlation signal C106 at every other sample period.

To ensure that the acquisition preamble (68,5) always ends in the desired phase state (such as two positive samples or two negative samples), the state of the precoder 10 is initialized to the appropriate value when writing the preamble (68,5) to the disk. For a PR4 read channel, for example, the delay registers in the $1/1+D^2$ precoder are initialized to zero and an even number of 1 bits are output by the data generator 4 to ensure that the preamble ends in either two positive samples or two negative samples.

Enabling the data/servo sync mark detector A120 at every other sample period aids in the computer search for the optimum fault tolerant sync mark. The search program can search for minimum correlation between the sync mark and shifted versions of the sync mark concatenated with the preamble at every other shift rather than at every shift. This increases the probability of finding a sync mark having a higher degree of fault tolerance.

The sync mark detection technique of the present invention can be easily extended to search for the sync mark at every fourth sample period rather than at every other sample period. This requires that the preamble always ends in the same two sample values (i.e., the preamble ends with the counter C128 always in one out of the four possible states). Further, this technique can easily be extended for use with other preamble formats (e.g., 3T, 4T, 6T, etc) and with other types of PR read channels (e.g., EPR4 and EEPR4).

Figure 7:
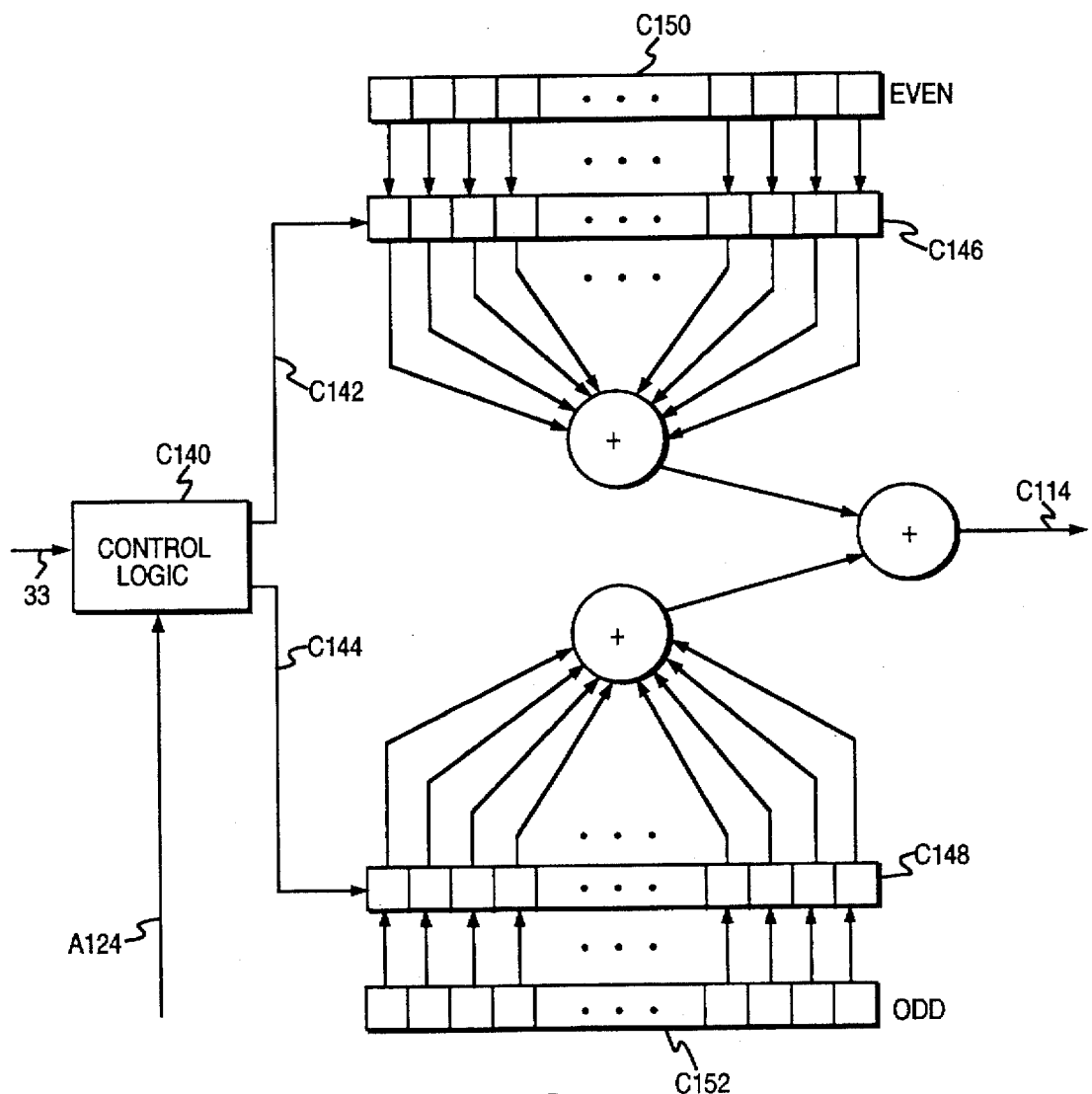
FIG. 7 is an alternative embodiment for the data/servo sync detector which processes the even and odd interleaves of the read signal in parallel.

In an alternative embodiment shown in FIG. 7, the data/servo sync mark detector A120 processes two bits of the detected sequence 33 at a time. The target sync mark C102 is separated into in an even and odd interleave and stored in an even register C150 and an odd register C152, respectively. Control logic C140 loads the even and odd interleaves (C142, C144) of the detected sequence 33 into the respective shift registers (C146,C148) in response to the enable signal A124 from the counter C128. The control logic C140 delays loading the shift registers (C146,C148) with the detected sequence 33 until the counter C128 of FIG. 6B is in either state (−A,−A) or state (+A,+A) which corresponds to counter C128 outputs 01 and 11.

In yet another embodiment not shown, the data/servo sync mark detector A120 correlates estimated sample values with expected sample values that corresponded to the target sync mark. For the purpose of this disclosure, then, the data/servo sync mark detector A120 is specified, in general, as generating channel values in response to the discrete time sample values and correlating the channel values with target values of a target sync mark.

Many changes in form and detail could be made without departing from the spirit and scope of the present invention; the particular embodiments disclosed herein are not intended to be limiting. The scope of the invention is properly construed from the following claims.

TABLE 1

| Channel | Transfer Function | Dipulse Response |
|---|---|---|
| PR4 | $(1-D)(1+D)$ | 0, 1, 0, −1, 0, 0, 0, . . . |
| EPR4 | $(1-D)(1+D)^2$ | 0, 1, 1, −1, −1, 0, 0, . . . |
| EEPR4 | $(1-D)(1+D)^3$ | 0, 1, 2, 0, −2, −1, 0, . . . |

TABLE B2

| Sample Value | Slicer Output |
|---|---|
| y >= T1 | +1 |
| −T2 <= y < T1 | 0 |
| y < −T2 | −1 |

TABLE C2

| State | Y(n − 1) | Y(n) | C0, C1 |
|---|---|---|---|
| +A, −A | +y | +y | 00 |
| −A, −A | +y | −y | 01 |
| −A, +A | −y | −y | 10 |
| +A, +A | −y | +y | 11 |

We claim:

1. A fault tolerant sync mark detector in a sampled amplitude read channel for reading data from a magnetic disc medium by detecting digital data from a sequence of discrete time sample values generated by sampling pulses in an analog read signal from a magnetic read head positioned over the magnetic disc medium, wherein:

the read channel generates channel values in response to the sample values; and the magnetic disc medium comprises a preamble field recorded at a predetermined frequency;

the sync mark detector comprising:

(a) a comparator for comparing the channel values to a target sync mark; and (b) an input for receiving a sample period interval control signal for enabling operation of the sync mark detector relative to the frequency of the preamble.

2. The fault tolerant sync mark detector as recited in claim 1, wherein the channel values are the digital data.

3. The fault tolerant sync mark detector as recited in claim 1, wherein the channel values are estimated sample values.

4. The fault tolerant sync mark detector as recited in claim 1, wherein a length and a value of the target sync mark are programmable.

5. The fault tolerant sync mark detector as recited in claim 1, wherein the comparator comprises a correlator comprising:

(a) a storage register for storing the target sync mark;

(b) a shift register shifted at a predetermined clock rate for storing the channel values; and (c) a means for correlating the storage register with the shift register to generate an output, wherein the output is enabled by control signal at a predetermined clock rate interval relative to the frequency of the preamble.

6. The fault tolerant sync mark detector as recited in claim 5, wherein the predetermined clock rate interval is two clock cycles.

7. The fault tolerant sync mark detector as recited in claim 5, wherein:

(a) the control signal is generated by a timing recovery circuit that acquires a phase and frequency of the preamble field during an acquisition mode; and (b) the timing recovery circuit generates expected sample values X(n) used to acquire the preamble field during the acquisition mode.

8. The fault tolerant sync mark detector as recited in claim 7, wherein:

(a) the expected sample values are generated by a state machine; and (b) a current state of the state machine generates the control signal.

9. The fault tolerant sync mark detector as recited in claim 8, wherein the state machine is a counter.

10. The fault tolerant sync mark detector as recited in claim 1, wherein the sync mark detector comprises a programmable threshold detector for detecting when a result of the comparison exceeds a predetermined value.

11. The fault tolerant sync mark detector as recited in claim 1, wherein:

(a) the digital data comprises: user data comprising a user preamble field followed by a user sync mark followed by a user data field; and embedded servo data comprising a servo preamble field followed by a servo sync mark followed by a servo data field;

(b) the fault tolerant sync mark detector is programmed to detect the user sync mark when the read channel is detecting the user data; and (c) the fault tolerant sync mark detector is programmed to detect the servo sync mark when the read channel is detecting the servo data.

12. The fault tolerant sync mark detector as recited in claim 1, wherein the sync mark detector processes an even and odd interleave of the channel values in parallel.

13. A fault tolerant method of detecting a sync mark in a sampled amplitude read channel for reading data from a magnetic disc medium by detecting digital data from a sequence of discrete time sample values generated by sampling pulses in an analog read signal from a magnetic read head positioned over the magnetic disc medium, comprising the steps of:

(a) acquiring a preamble field recorded on the magnetic disc medium at a predetermined frequency;

(b) generating channel values in response to the sample values; and (c) directly comparing the channel values to a target sync mark according to a predetermined sample period interval relative to the frequency of the preamble.

14. The fault tolerant method of detecting a sync mark as recited in claim 13, wherein the channel values are the digital data.

15. The fault tolerant method of detecting a sync mark as recited in claim 13, wherein the channel values are estimated sample values.

16. The fault tolerant method of detecting a sync mark as recited in claim 13, wherein a length and a value of the target sync mark is programmable.

17. The fault tolerant method of detecting a sync mark as recited in claim 13, further comprising the steps of:

(a) storing the target sync mark in a storage register;

(b) shifting the channel values into a shift register at a predetermined clock rate; and (c) correlating the storage register with the shift register to generate an output; and (d) enabling the output at a predetermined clock rate interval relative to the frequency of the preamble.

18. The fault tolerant method of detecting a sync mark as recited in claim 17, wherein the predetermined clock rate interval is two clock cycles.

19. The fault tolerant method of detecting a sync mark as recited in claim 17, further comprising the steps of:

(a) acquiring a phase and frequency of the preamble field during an acquisitions mode; and (b) generating expected sample values X(n) used to acquire the preamble field during the acquisition mode.

20. The fault tolerant method of detecting a sync mark as recited in claim 19, further comprising the steps of:

(a) generating the expected sample values with a state machine; and (b) enabling the output according to a current state of the state machine.

21. The fault tolerant method of detecting a sync mark as recited in claim 20, wherein the state machine is a counter.

22. The fault tolerant method of detecting a sync mark as recited in claim 13, further comprising the step of detecting when a result of the comparison exceeds a predetermined value.

23. The fault tolerant method of detecting a sync mark as recited in claim 13, wherein the digital data comprises user data comprising a user preamble field followed by a user sync mark followed by a user data field and embedded servo data comprising a servo preamble field followed by a servo sync mark followed by a servo data field; further comprising the steps of:

(a) detecting the user sync mark using a user target sync mark when the read channel is detecting the user data; and (b) detecting the servo sync mark using a servo target sync mark when the read channel is detecting the servo data.

24. The fault tolerant method of detecting a sync mark as recited in claim 13, further comprising the step of processing an even and odd interleave of the channel values in parallel.

25. A sampled amplitude read channel for reading data from a magnetic disc medium by detecting digital data from a sequence of discrete time sample values generated by sampling pulses in an analog read signal from a magnetic read head positioned over the magnetic disc medium, the digital data comprises a preamble field followed by a sync mark followed by a data field, the sampled amplitude read channel comprising:

(a) a timing recovery circuit for acquiring a phase and frequency of the preamble field and outputting a control signal in response to the preamble field;

(b) a detector for detecting an estimated data sequence from the discrete time sample values; and (c) a fault tolerant sync mark detector, directly responsive to the control signal and the estimated data sequence, for detecting a sync mark in the estimated data sequence and framing operation of an RLL decoder.

\* \* \* \* \*